Oct. 31, 1933.  V. BENDIX  1,932,879

BRAKE

Filed Dec. 13, 1928

INVENTOR.
VINCENT BENDIX
BY
ATTORNEY

Patented Oct. 31, 1933

1,932,879

UNITED STATES PATENT OFFICE 1,932,879

BRAKE

Vincent Bendix, Chicago, Ill., assignor to Bendix Brake Company, South Bend, Ind., a corporation of Illinois Application December 13, 1928
Serial No. 325,743

10 Claims. (Cl. 188—78)

This invention relates to brakes and is illustrated as embodied in an internal expanding brake for an automobile. An object of the invention is to provide effective and simple operating means for a floating shoe brake of this type, the invention being particularly characterized in that said means performs the additional function of a torque taking anchor.

In the embodiment illustrated a plurality of pivotally connected internal brake shoes are supported within a rotatable drum to be urged thereagainst by my novel wedge-shaped combined cam and anchor in such a manner that one shoe is adapted to energize the other depending upon the direction of rotation of the drum.

Various features of novelty relate to the construction of the friction means comprising rollers on the ends thereof adapted to receive the brake applying thrust, which rollers co-operate with a radially movable wedge cam, the latter supported by a novel bracket attached to the brake support and actuated by a novel arrangement of bell crank lever within the bracket.

These and other features of novelty, desirable constructions and arrangements of parts will be apparent from the following description of the illustrated embodiment shown in the accompanying drawing, in which.

Figure 1:
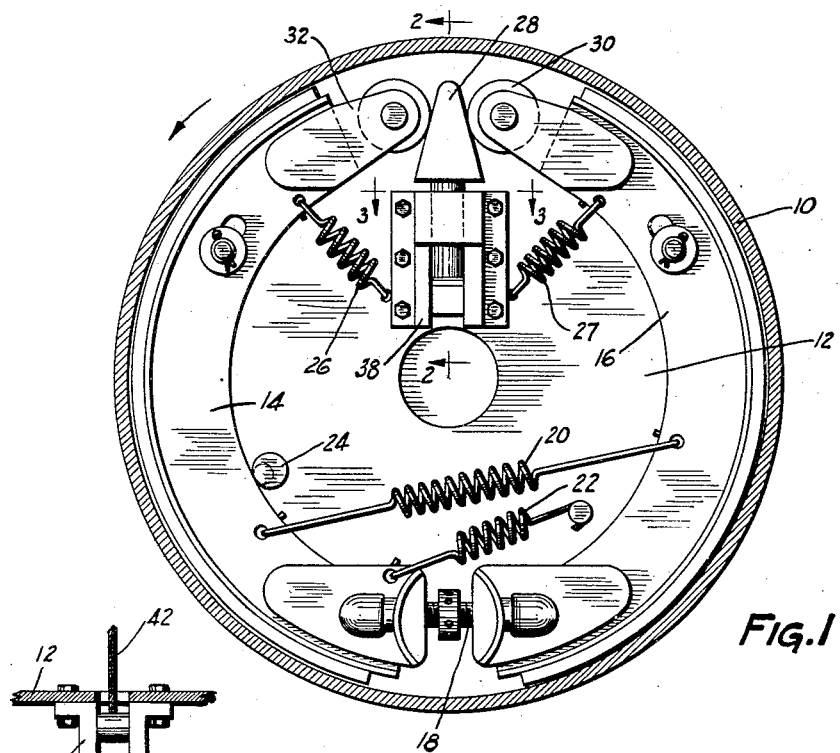
Figure 1 is a vertical section through the brake, just inside the head of the brake drum, and showing the brake shoes in side elevation.

The illustrated brake includes a rotatable drum 10, at the open side of which is a support such as a backing plate 12, and within which is the friction means of the brake shown as including two floating interchangeable brake shoes 14 and 16, connected by an adjustable floating pivot joint 18 held together by a tension spring 20. The shoes are urged by a spring 22 toward a normal idle position determined by an eccentric adjustable stop 24.

The brake is applied, against the resistance of a return spring 26, supplemented by spring 27, by novel means shown as including a wedge-shaped cam 28 contacting anti-friction rollers 30 preferably mounted in the ends of the shoes between spaced plates 32 rigidly secured thereon.

The wedge cam 28 is preferably provided with an elongated shank portion 34 adapted to slide radially of the backing plate in a boss 36 integral with and tying together angle bracket members 38 rigidly secured to the brake support. The boss 36 is projected outwardly from the support and the brackets are spaced to receive a bell crank lever 40 pivoted therebetween to co-operate with the shank of the cam. The lever may be operated by a suitable tension element such as a flexible cable 42 passing through a slot 44 in the backing plate, which slot is coextensive with the bracket to permit movement of the lever therethrough.

Figures 2, 3, 4, 5:
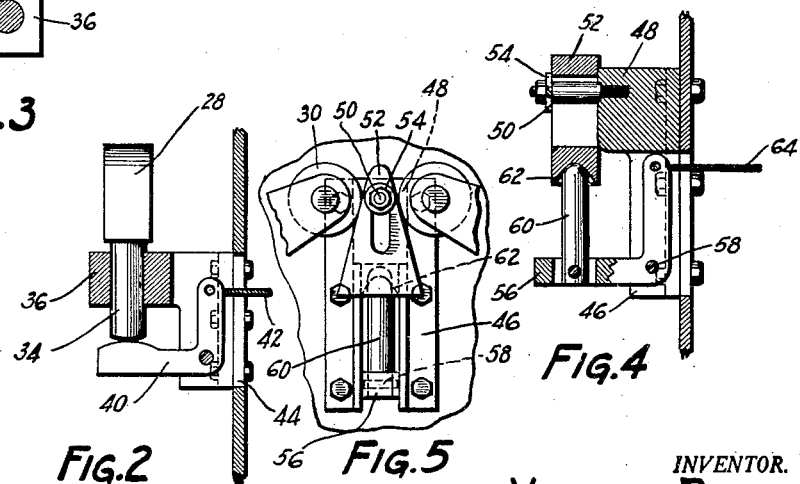
Figure 2 is a partial section through the brake, on the line 2—2 of Figure 1, showing the operating control mechanism.
Figure 3 is a further showing of the control structure indicating the bracket support in plan, the section being taken on line 3—3 of Figure 1.
Figure 4 is a section similar to Figure 2 showing a modified form of control.
Figure 5 is a front elevation of the control disclosed in Figure 4.

As an alternative arrangement of the operating means, I may provide, as illustrated in Figures 4 and 5, angle bracket members 46 integrally joined by a boss 48, seated on the backing plate. A post 50 may be affixed to the boss to support a slotted wedge cam 52 in its movement, a washer 54 confining the cam against axial movement on the post. The cam is preferably actuated by a bell crank lever 56, pivoted at 58 to the bracket members, the lever being provided with a link 60 pivoted thereto at one end, which link is adapted to fit within a recess 62 in the cam. Movement of the tension element 64 transmits, through the link 60, the necessary movement of the cam.

It will be noted that in the arrangement described the cam functions both as an applying means for the brake and as an anchor means for taking the powerful braking torque. The rollers of the shoes or other equivalent friction means are at all times in contact with the cam, being urged thereagainst by the angularly disposed tension springs 26 secured to the brake support. Such a construction obviates the usual noisy click of most brakes caused by the contact of the friction means with the anchor upon brake application. With my construction one or the other of the ends of the brake remains anchored against the cam at all times.

It will be seen that, with the drum turning counter clockwise in the normal operation with the automobile moving forward, as indicated by the arrow in Figure 1, the torque of the brake is taken by the wedge cam 28, through the action of the shoe 16 with its roller on the right side of the cam. In case of a sharp increase in the coefficient of friction of the brake lining, sometimes caused by the relative humidity of the atmosphere or by foreign matter on the lining surface, the pressure against the anchoring side of the cam will be materially increased thus resisting further radial movement of the cam and the consequent brake applying force applied by the drum. That portion of the force which is effective in applying the brake is thus reduced in proportion as the friction of the brake is increased, making the brake at least partially self-compensating for variations in lining friction. With clockwise rotation of the drum in reverse braking, a similar effect is produced.

While one illustrative embodiment has been described in detail, it is not my intention to limit the scope of the invention to that particular embodiment or otherwise than by the terms of the appended claims.

I claim:

1. A brake comprising a fixed support, a rotatable drum associated therewith, friction members movably positioned on the support adaptable for co-operation with the drum, a bracket positioned on the support, a member movable on the bracket radially with respect to the support between adjacent ends of the friction members and means on the bracket for actuating the member including a bell crank lever having one arm parallel to the support and its other arm perpendicular to the support.

2. A brake comprising a fixed support, a rotatable drum associated therewith, friction members positioned on the support adaptable for co-operation with the drum having spaced ends, a bracket positioned on the support, a member movable on the bracket extending between the spaced ends of the friction members and means for actuating the member including a bell crank lever pivoted on the bracket.

3. A brake comprising a fixed support, a rotatable drum associated therewith, friction members movably positioned on the support adaptable for co-operation with the drum, a bracket positioned on the support having spaced flanges, a member movable on the bracket adapted to actuate the friction members and a bell crank lever pivoted between flanges on the bracket for moving members.

4. A brake comprising a fixed support, a drum associated therewith, a plurality of pivotally connected brake shoes on the support for co-operation with the drum, an operating member movable radially only for the shoes and a bell crank lever movable transversely of the fixed support for actuating the operating member.

5. A brake comprising a fixed support, a rotatable drum associated therewith, an annular friction means on the support for cooperation with the drum having its continuity broken by a short gap, a wedge-shaped applying means and anchor movably positioned on the support and disposed within the gap means for yieldingly maintaining the friction means in engagement with the applying means and means for operating the applying means including a lever pivotally supported on the fixed support with one end engaging the applying means and its other end substantially parallel to the fixed support.

6. A brake comprising a backing plate, a rotatable drum associated therewith, friction means having separable ends positioned on the backing plate for cooperation with the drum, a wedge-shaped applying and anchoring means movable radially on the backing plate between separable ends, the applying and anchoring means being arranged to automatically resist radial movement of the applying means with an increase in the effectiveness of the friction means and an actuating lever for the applying means pivotally supported on the backing plate with one end parallel to the plate and its other end perpendicular to the plate.

7. A brake comprising a fixed support, a drum associated therewith, floating friction means on the support for cooperation with the drum, a wedge-shaped member positioned on the support between separable ends of the friction means, a bell crank lever pivoted on the support having one arm substantially parallel to the support and its other arm perpendicular thereto and linkage connecting the perpendicular arm to the wedge-shaped member.

8. A brake comprising a fixed support, a rotatable drum associated therewith, friction means on the support having spaced ends, a roller in each of the ends, a wedge-shaped member movable on the support between the rollers and operating means including a lever pivoted on the support having one arm engaging the member and its other arm parallel to the fixed support.

9. A brake comprising a fixed support, a drum associated therewith, friction members on the support adaptable for cooperation with the drum, means for actuating the friction members including a member positioned on the support and movable radially between adjacent ends of the friction members, a bell crank lever fulcrumed on said support and means connecting said bell crank to said member to transform crank motion to the radial movement of said member.

10. A brake comprising a fixed support, a drum, friction members having separable ends, a bracket, wedge means adapted to spread said ends, and constrained to move radially in said bracket, and a bell crank fulcrumed in said bracket to actuate said wedge means.

VINCENT BENDIX.